(12) United States Patent
Ma et al.

(10) Patent No.: US 11,553,577 B2
(45) Date of Patent: Jan. 10, 2023

(54) SYSTEM AND METHOD FOR ACHIEVING SYNCHRONIZED AUDIO AND IMAGE CONTROL OF LIGHTING

(71) Applicant: SHENZHEN LINKLITE SMART LIGHTING CO., LTD, Shenzhen (CN)

(72) Inventors: Yi Ma, Shenzhen (CN); Shangchao Zhang, Shenzhen (CN); Hui Dai, Shenzhen (CN); Wenjun Xie, Shenzhen (CN)

(73) Assignee: SHENZHEN LINKLITE SMART LIGHTING CO., LTD, Shenzhen (CN)

( * ) Notice: Subject to any disclaimer, the term of this patent is extended or adjusted under 35 U.S.C. 154(b) by 0 days.

(21) Appl. No.: 17/855,185

(22) Filed: Jun. 30, 2022

(65) Prior Publication Data
US 2022/0353975 A1 Nov. 3, 2022

Related U.S. Application Data

(63) Continuation-in-part of application No. PCT/CN2021/137961, filed on Dec. 14, 2021.

(51) Int. Cl.
| | |
|---|---|
| H04N 21/41 | (2011.01) |
| H05B 47/165 | (2020.01) |
| H05B 47/155 | (2020.01) |
| H05B 47/18 | (2020.01) |
| H05B 47/17 | (2020.01) |
| H05B 47/105 | (2020.01) |

(52) U.S. Cl.
CPC ....... *H05B 47/165* (2020.01); *H04N 21/4131* (2013.01); *H05B 47/105* (2020.01); *H05B 47/155* (2020.01); *H05B 47/17* (2020.01); *H05B 47/18* (2020.01)

(58) Field of Classification Search
CPC .. H05B 47/165; H05B 47/105; H05B 47/155; H05B 47/17; H05B 47/18; H04N 21/4131
See application file for complete search history.

(56) References Cited

U.S. PATENT DOCUMENTS

| 6,611,297 B1 * | 8/2003 | Akashi | H05B 47/10 348/739 |
|---|---|---|---|
| 7,708,419 B2 * | 5/2010 | Huang | H05B 47/12 362/276 |
| 8,154,669 B2 | 4/2012 | Wang et al. | |

(Continued)

*Primary Examiner* — Michael Lee
(74) *Attorney, Agent, or Firm* — Li & Cai Intellectual Property (USA) Office

(57) ABSTRACT

A system and method for achieving synchronized audio and image control of lighting is provided. The system includes: audio-image information acquisition and processing software of an audio-image playback device for achieving acquisition, analysis, and processing of audio and screen image information, and encapsulating the audio and screen image information into a synchronization control instruction according to a predetermined control strategy; a cloud server; and a lighting device for receiving the synchronization control instruction transmitted from the audio-image information acquisition and processing software to separate out audio and screen image color control instructions, and controlling colors and rhythm changes of a lamp according to a predetermined control strategy.

14 Claims, 11 Drawing Sheets

(56) References Cited

U.S. PATENT DOCUMENTS

| | | | |
|---|---|---|---|
| 8,938,447 B2* | 1/2015 | Van Den Dungen | H04N 5/64 |
| | | | 348/602 |
| 8,938,468 B2* | 1/2015 | Morgan | H05B 47/155 |
| | | | 707/769 |
| 9,602,769 B2 | 3/2017 | Cheng et al. | |
| 10,531,542 B2 | 1/2020 | Rodinger et al. | |
| 2009/0109340 A1* | 4/2009 | Iwanami | H04N 21/43074 |
| | | | 348/602 |
| 2010/0213877 A1* | 8/2010 | Galeazzi | H05B 45/46 |
| | | | 362/613 |
| 2011/0075036 A1* | 3/2011 | Galeazzi | H04N 5/64 |
| | | | 348/602 |
| 2011/0149156 A1* | 6/2011 | Tokumo | H04N 21/8543 |
| | | | 348/E7.017 |
| 2014/0142762 A1* | 5/2014 | Li | H04N 9/73 |
| | | | 700/275 |
| 2015/0092110 A1* | 4/2015 | Li | H04N 21/4131 |
| | | | 348/602 |
| 2018/0199414 A1* | 7/2018 | Zheng | H05B 47/19 |
| 2020/0275152 A1* | 8/2020 | Rycroft | H04N 21/44008 |

\* cited by examiner

| statuses of lighting devices 1 to X are synchronized with screen and sound information | | | | | | | | |
|---|---|---|---|---|---|---|---|---|
| lighting device 1 | lighting device 2 | lighting device 3 | lighting device 4 | lighting device 5 | lighting device 6 | lighting device 7 | lighting device 8 | lighting device X |
| 1. color is related to the color of the acquisition area A1 2. brightness is related to amplitude of one frequency F of acquisition sound | 1. color is related to the color of the acquisition area A2 2. brightness is related to amplitude of one frequency F of acquisition sound | 1. color is related to the color of the acquisition area A3 2. brightness is related to amplitude of one frequency F of acquisition sound | 1. color is related to the color of the acquisition area B1 2. brightness is related to amplitude of one frequency F of acquisition sound | 1. color is related to the color of the acquisition area B2 2. brightness is related to amplitude of one frequency F of acquisition sound | 1. color is related to the color of the acquisition area B3 2. brightness is related to amplitude of one frequency F of acquisition sound | 1. color is related to the color of the acquisition area C1 2. brightness is related to amplitude of one frequency F of acquisition sound | 1. color is related to the color of the acquisition area C2 2. brightness is related to amplitude of one frequency F of acquisition sound | 1. color is related to the color of the acquisition area X 2. brightness is related to amplitude of one frequency F of acquisition sound |

FIG. 8 statuses of lighting devices are synchronized with screen information or sound information status one:
colors of LED1 to LEDX are related to colors of any area of acquisition areas A1 to X
brightnesses of LED1 to LEDX are related to brightnesses of any area of acquisition areas A1 to X
status two:
colors of LED1 to LEDX are related to one acquisition sound frequency
brightnesses of LED1 to LEDX are related to acquisition sound amplitude value

FIG. 10

SYSTEM AND METHOD FOR ACHIEVING SYNCHRONIZED AUDIO AND IMAGE CONTROL OF LIGHTING

CROSS-REFERENCE TO RELATED PATENT APPLICATION

This application claims the benefit of priority to China Patent Application No. CN202110482642.X, filed on Apr. 30, 2021 in People's Republic of China. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to the field of lighting, and more particularly to a system and a method for achieving synchronized audio and image control of lighting.

BACKGROUND OF THE DISCLOSURE

In order to enable an ordinary lamp to have richer entertainment features, there are many commercially available forms of lamp control methods mainly extract corresponding screen colors from a PC screen and a TV screen, and then control related external ambient lamps and the like; or according to music in a particular environment, extract corresponding musical features to control the external ambient lamps to change according to certain rhythm and tempo. However, for a rich multimedia content that often synchronously contain rich video images and audio information, the lighting display solutions currently available cannot achieve the synchronization of audio, image and lighting, thus the user experience is insufficient.

SUMMARY OF THE DISCLOSURE

In response to the above-referenced technical inadequacies of not achieving the synchronization of audio, image and lighting, the present disclosure provides a system and a method for achieving synchronized audio and image control of lighting.

The technical issues as mentioned in the present disclosure are addressed through solutions as follows:

In one aspect, the present disclosure provides a system for achieving synchronized audio and image control of lighting. The system includes audio-image information acquisition and processing software in an audio-image playback device for achieving audio and screen image information acquisition, according to a predetermined strategy, analyzing and processing the audio and screen image information, and encapsulating the audio and screen image information into a synchronization control instruction; a cloud server for storing user login information, control command information for at least one lighting device, and status information reported by the lighting device; and the lighting device for receiving the synchronization control instruction transmitted by the audio-image information acquisition and processing software, separating audio and screen image color control commands, and controlling color and rhythm changes of a lamp according to a predetermined control strategy so as to achieve synchronized audio and image control of the lighting.

In certain embodiments, the audio-image information acquisition and processing software includes: a strategy control module, a screen acquisition module, an audio acquisition module, and a data framing module; the strategy control module (11) configures and transmits audio and screen image sampling strategies according to a user-definition; the screen acquisition module (12) receives the sampling strategies transmitted by the strategy control module (11) and accordingly acquires image feature data; the audio acquisition module (13) receives the sampling strategies transmitted by the strategy control module (11) and accordingly acquires audio feature data; the data framing module (14) receives the sampling strategies transmitted by the strategy control module (11) and assembles the image feature data acquired by the screen acquisition module (12) and the audio feature data acquired by the audio acquisition module (13) into a same frame to form synthesized frame data and transmit the synthesized frame data; the cloud server includes N+1 backup cloud servers; the lighting device includes a data receiving and caching unit, a frame data parsing unit, and a lighting device status corresponding unit; in which the data receiving and caching unit receives and caches the synthesized frame data transmitted by the audio-image information acquisition and processing software (1), the frame data parsing unit parses out a color and sound control instruction from the synthesized frame data cached by the data receiving and caching unit, and the lighting device status corresponding unit synchronously converts the color and sound control instruction parsed out by the frame data parsing unit into color and brightness signal values of the corresponding lighting device (3).

In certain embodiments, the lighting device is plural in quantity and the plurality of lighting devices are controlled by one or more modes of Wi-Fi LAN broadcast, Wi-Fi WAN, Wi-Fi mDNS protocol, BLUETOOTH® mesh, and ZIGBEE® mesh, so as to achieve linkage therebetween.

In certain embodiments, the strategy control module receives a user-defined configuration on the audio and screen image sampling strategies, and accordingly outputs an audio and screen image acquisition range, an acquisition clock, a clock stamp label, a number of screen image blocks, and an acquisition area; in which the audio sampling strategy includes an input source of audio acquisition, a number of channels of acquisition sound, audio sampling frequencies, and an audio data buffer; in which the screen image sampling strategy includes image sampling frequencies, a number of color acquisition blocks, and a color acquisition area.

In certain embodiments, the screen acquisition module receives an acquisition frequency of each frame, a start time stamp, a number of image blocks per frame and area outputted by the strategy control module, reading a complete frame of data each time, achieving a dominant color extraction according to a K-means clustering algorithm via a data block feature statistic calculation, obtaining an RGB value of the most dominant color and a corresponding brightness value N in each data block, and obtaining a calculation time duration $\Delta Tv$; in which an nth frame image feature data packet is formed according to the calculation.

In certain embodiments, the audio acquisition module receives the acquisition frequency of each frame and the start time stamp outputted by the strategy control module, reading a complete frame of data each time through an interface function from an audio pulse data stream of the audio-image playback device, transforming a time domain signal sample to a sample in a discrete-time Fourier transform frequency domain after an FFT calculation, obtaining the strongest three frequency values F1, F2, F3 and an amplitude Af in each sample, and obtaining a calculated time duration ΔTa; in which an nth frame audio feature data packet is formed according to the calculation after adding a time stamp.

In certain embodiments, the data framing module receives the acquisition frequency of each frame outputted by the strategy control module, and, according to the time stamp and a delay mark, reads data sampled at a same point in time or data acquired at an adjacent point in time from the cache unit; according to different delay of audio and image processing, composing data having a smallest delay interval into a same frame of audio and image synchronized mixed data packet; in which, when |ΔnTv−ΔnTa|<Tms and audio and image data of the nth frame are synchronized, assembling the audio and image data of the nth frame into a same frame of synthesized frame data, in which ΔnTv indicates a time interval from the time stamp to an acquisition of video data of the nth frame, ΔnTa indicates a time interval from the time stamp to an acquisition of the audio data of the nth frame, and Tms indicates that an time point difference between the acquisitions of the audio and video data is T milliseconds; in which, when |ΔnTv−ΔnTa|>Tms and the audio and image data of the nth frame are not synchronized, assembling audio data of an n+1th frame and the image data of the nth frame into a same frame of synthesized frame data, or assembling image data of the n+1th frame and the audio data of the nth frame into a same frame of synthesized frame data and transmitting the frame of synthesized frame data.

In certain embodiments, the data receiving and caching unit receives the synthesized frame data transmitted by the audio-image information acquisition and processing software and caches the synthesized frame data; in which the frame data parsing unit parses synthesized frame data of each frame, parse out the color and sound control instruction; the synthesized frame data of each frame include a lighting device address Nx, an area color value RGB, an area brightness value N, a sound frequency value f, a sound amplitude value Af, A/B/C/X information that respectively indicate a complete video frame in an area A/area B/area C/customized extension area X, after the screen acquisition module acquires RGB data of each pixel in the above-mentioned areas, a mean calculation is performed to obtain RGB value of the area A/area B/area C, F information that contain an amplitude value of sound acquired at a point in time and the audio frequency value f and the corresponding audio amplitude value Af at the point in time are obtained after an FFT calculation, a Vflag that indicate a start mark of video data in a same frame data, and an Aflag that indicate a start mark of audio data in the same frame data; in which the lighting device state corresponding unit converts the lighting device address Nx, the area color signal value RGB, the area brightness value N, the audio signal frequency value f, and the audio amplitude Af that are parsed, into the color and brightness signal values of the corresponding lighting device according to the predetermined control strategy.

In certain embodiments, achieving synchronized audio and image control of lighting includes: a mode of combination of multiple ones of the lighting devices achieving changes that synchronize with screen color and sound; or two and more than two of the multiple ones of the lighting devices synchronously achieving changes that synchronize with the screen color and sound; or an independent lighting in the lighting device achieving changes that synchronize with the screen color and sound via two states, respectively; or the lighting device achieving changes that synchronize with the screen color and sound via two states, respectively.

In another aspect, the present disclosure provides a method for achieving synchronized audio and image control of lighting. The method includes steps as follows: S1: acquiring audio and screen image information of an audio-image playback device, according to a predetermined strategy, analyzing and processing the audio and screen image information, and encapsulating the audio and screen image information into a synchronization control instruction, and transmitting the synchronization control instruction; S2: receiving and caching the synchronization control instruction transmitted by the audio-image information acquisition and processing software, parsing out an audio and screen color synchronization control instruction, executing the synchronization control instruction according to a predetermined control strategy, and controlling color and rhythmic changes of a lamp so as to achieve synchronized audio and image control of lighting.

In certain embodiments, step S1 includes: receiving a user-defined configuration on the audio and screen image sampling strategies, and accordingly outputting an audio and screen image acquisition range, an acquisition clock, a clock stamp label, a number of screen image blocks, and an acquisition area; in which the audio sampling strategy includes an input source of audio acquisition, a number of channels of acquisition sound, audio sampling frequencies, and an audio data buffer; in which the screen image sampling strategy includes image sampling frequencies, a number of color acquisition blocks, and a color acquisition area.

In certain embodiments, step S1 further includes: receiving an acquisition frequency of each frame, a start time stamp, a number of image blocks per frame and area outputted by a strategy control module, reading a complete frame of data each time, achieving a dominant color extraction according to a K-means clustering algorithm via a data block feature statistic calculation, obtaining an RGB value of a most dominant color and a corresponding brightness value N in each data block, and obtaining a calculation time duration ΔTv; in which an nth frame image feature data packet is formed according to the calculation.

In certain embodiments, step S1 further includes: receiving the acquisition frequency of each frame and the start time stamp outputted by the strategy control module, reading a complete frame of data each time through an interface function from an audio pulse data stream of the audio-image playback device, transforming a time domain signal sample to a sample in a discrete-time Fourier transform frequency domain after an FFT calculation, obtaining the strongest three frequency values F1, F2, F3 and an amplitude Af in each sample, and obtaining a calculated time duration ΔTa; in which an nth frame audio feature data packet is formed according to the calculation after adding a time stamp.

In certain embodiments, step S1 further includes: receiving the acquisition frequency of each frame outputted by the strategy control module, and, according to the time stamp and a delay mark, reading data sampled at a same point in time or data acquired at an adjacent point in time from the cache unit; according to different delay of audio and image processing, composing data having a smallest delay interval into a same frame of audio and image synchronized mixed data packet; in which, when |ΔnTv−ΔnTa|<Tms and audio and image data of the nth frame are synchronized, assembling the audio and image data of the nth frame into a same frame of synthesized frame data, in which ΔnTv indicates a time interval from the time stamp to an acquisition of the image data of the nth frame, ΔnTa indicates a time interval from the time stamp to an acquisition of video data of the nth frame, and Tms indicates that an time point difference between the acquisitions of the audio and video data is T milliseconds; in which, when |ΔnTv−ΔnTa|>Tms and the audio and image data of the nth frame are not synchronized, assembling audio data of an n+1th frame and the image data of the nth frame into a same frame of synthesized frame data, or assembling image data of the n+1th frame and the audio data of the nth frame into a same frame of synthesized frame data and transmitting the frame of synthesized frame data.

In certain embodiments, step S2 includes steps as follows: S21: receiving the synthesized frame data transmitted by the audio-image information acquisition and processing software and caching the synthesized frame data; S22: parsing synthesized frame data of each frame, parsing out the color and sound control instruction; the synthesized frame data of each frame include a lighting device address Nx, an area color value RGB, an area brightness value N, a sound frequency value f, a sound amplitude value Af, A/B/C/X information that respectively indicate a complete video frame in an area A/area B/area C/customized extension area X, after the screen acquisition module acquires RGB data of each pixel in the above-mentioned areas, a mean calculation is performed to obtain RGB value of the area A/area B/area C, F information that contain an amplitude value of sound acquired at a point in time and the audio frequency value f and the corresponding audio amplitude value Af at the point in time are obtained after an FFT calculation, a Vflag that indicate a start mark of video data in a same frame data, and an Aflag that indicate a start mark of audio data in the same frame data; S23: converting the lighting device address Nx, the area color signal value RGB, the area brightness value N, the audio signal frequency value f, and the audio amplitude Af that are parsed, into the color and brightness signal values of the corresponding lighting device according to the predetermined control strategy.

In certain embodiments, a combination of multiple ones of the lighting devices achieves changes that synchronize with screen color and sound; or two and more than two of the multiple ones of the lighting devices synchronously achieve changes that synchronize with the screen color and sound; or an independent lighting in the lighting device achieves changes that synchronize with the screen color and sound via two states, respectively; or the lighting device achieves changes that synchronize with the screen color and sound via two states, respectively.

In comparison with conventional technologies, the beneficial effects of the present disclosure include: the present disclosure may achieve the synchronous acquisition and feature extraction of multimedia audio and image contents, and reorganize an audio and image data mixing group package through time stamp marks and delay calculation of the delay of an audio and image data processing process, thereby eliminating asynchronous issues such as lag in a change of color or an advanced change of melody and the like in audio and image. Furthermore, these two types of information are simultaneously and synchronously acquired to prompt ambient lamps and the like to change in real time according to the change of the two types of information, such that the lighting device effect is synchronously shown following the multimedia audio and image contents so as to provide an improved user experience.

BRIEF DESCRIPTION OF THE DRAWINGS

FIG. 8 is a schematic diagram of a lighting synchronization type two for achieving synchronized audio and image control of lighting according to embodiments of the present disclosure;

FIG. 10 is a schematic diagram of a lighting synchronization type four for achieving synchronized audio and image control of lighting according to embodiments of the present disclosure.

DETAILED DESCRIPTION OF THE EXEMPLARY EMBODIMENTS

The present disclosure is further described below with respect to the accompanying drawings and in conjunction with preferable embodiments. It should be noted that, in scenarios without conflict, the embodiments and the features therein in the present disclosure can be combined with each other.

It should be noted that, orientation terms such as left, right, up, down, top, and bottom that are used in the embodiments are only relative concepts to each other or for reference in a normal state of use of a product, and should not be considered as limiting.

The present disclosure addresses technical disadvantages by obtaining the color and brightness information of the screen image through real-time acquisition of the screen of the mobile phone/PC/TV screen, simultaneously acquiring current audio information related to the screen image that is displayed, and synthesizing a synchronization control instruction after information processing, thereby achieving a consistent color of lighting and the screen image through a lamp control device. Furthermore, the present disclosure synchronously shows display schemes that have different patterns and frequencies according to the audio information.

Figure 1:
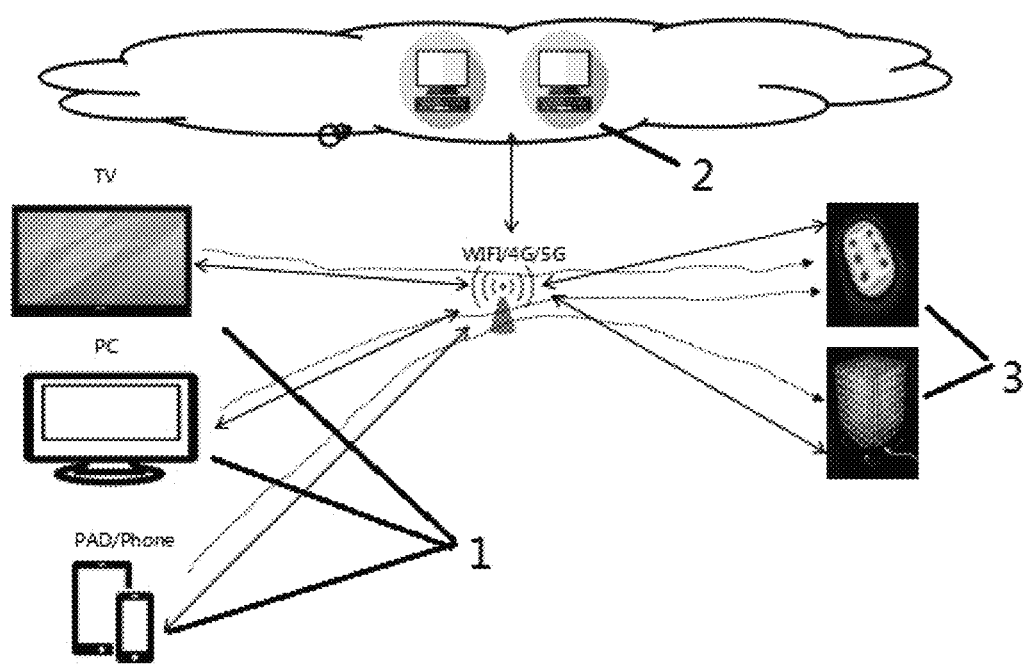
FIG. 1 is a system diagram for achieving synchronized audio and image control of lighting according to embodiments of the present disclosure.

Reference is made to FIG. 1, which shows a system diagram for achieving synchronized audio and image control of lighting. The system includes audio and screen image acquisition and processing software 1 (i.e., audio-image information acquisition and processing software 1) in an audio-image playback device such as a TV/PC/PAD/Phone at a frontend; a cloud server 2 and N+1 backup cloud servers in the middle; and a lighting device 3 at a backend. The audio-image information acquisition and processing software 1 includes: a strategy control module 11, a screen acquisition module 12, an audio acquisition module 13, and a data framing module 14; the strategy control module 11 configures and transmits audio and screen image sampling strategies according to a user-definition; the screen acquisition module 12 receives the sampling strategies transmitted by the strategy control module 11 and accordingly acquires image feature data; the audio acquisition module 13 receives the sampling strategies transmitted by the strategy control module 11 and accordingly acquires audio feature data; the data framing module 14 receives the sampling strategies transmitted by the strategy control module 11 and assembles the image feature data acquired by the screen acquisition module 12 and the audio feature data acquired by the audio acquisition module 13 into a same frame to form synthesized frame data and transmit the synthesized frame data.

The lighting device 3 includes: a data receiving and caching unit, a frame data parsing unit, and a lighting device status corresponding unit; in which the data receiving and caching unit receives and caches the synthesized frame data transmitted by the audio-image information acquisition and processing software 1, the frame data parsing unit parses out a color and sound control instruction from the synthesized frame data cached by the data receiving and caching unit, and the lighting device status corresponding unit synchronously converts the color and sound control instruction parsed out by the frame data parsing unit into color and brightness signal values of the corresponding lighting device 3.

The lighting device 3 is plural in quantity and the plurality of lighting devices 3 are controlled by one or more modes of Wi-Fi LAN broadcast, Wi-Fi WAN, Wi-Fi mDNS protocol, BLUETOOTH® mesh, and ZIGBEE® mesh, so as to achieve linkage therebetween. Embodiments of the present disclosure include three portions of content:

In a first portion, the audio-image information acquisition and processing software 1 in an audio-image playback device for achieving audio and screen image information acquisition, according to a predetermined strategy, analyzing and processing the audio and screen image information, and encapsulating the audio and screen image information into a synchronization control instruction.

In a second portion, the lighting device 3 receives the synchronization control instruction transmitted by the audio-image information acquisition and processing software, separating audio and screen image color control commands, and controlling color and rhythm changes of a lamp according to a predetermined control strategy so as to achieve synchronized audio and image control of the lighting.

In a third portion, the lighting device 3 at the backend includes a plurality of communication modes for a single lamp or a linkage between multiple lamps, and includes presentation modes for lighting effects.

The cloud server 2 and the N+1 backup cloud server are configured to store user login information, control command information for at least one lighting device 3, and status information reported by the lighting device 3.

Figure 2:
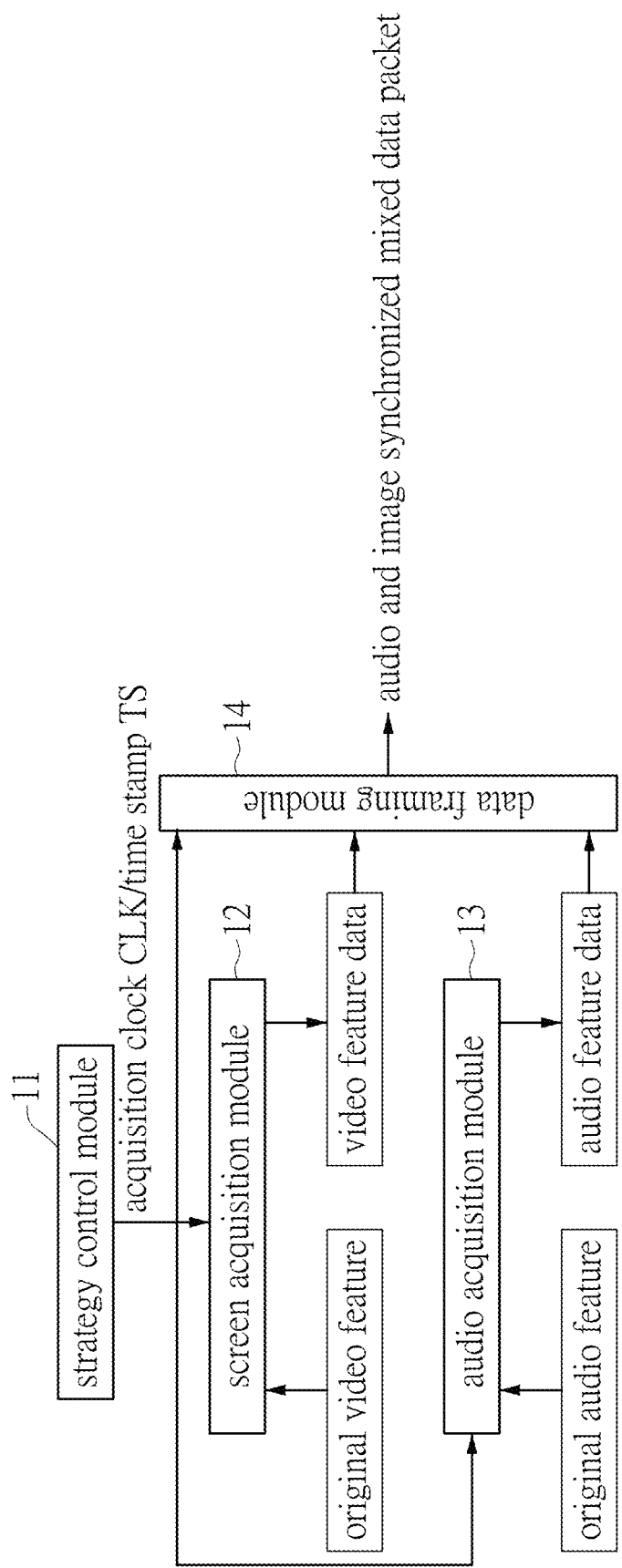
FIG. 2 is a software module diagram for achieving synchronized audio and image control of lighting according to embodiments of the present disclosure.

Reference is made to FIG. 2, which is a software module diagram of the first portion of content showing a software module for acquiring, processing and encapsulating audio and screen image data, the software module includes four steps as follows:

In Step 1, the strategy control module receives a user-defined configuration on the audio and screen image sampling strategies, and accordingly outputs an audio and screen image acquisition range, an acquisition clock, a clock stamp label, a number of screen image blocks, and an acquisition area; in which the audio sampling strategy includes an input source of audio acquisition, a number of channels of acquisition sound, audio sampling frequencies, and an audio data buffer; in which the screen image sampling strategy includes image sampling frequencies, a number of color acquisition blocks, and a color acquisition area.

Figure 3:
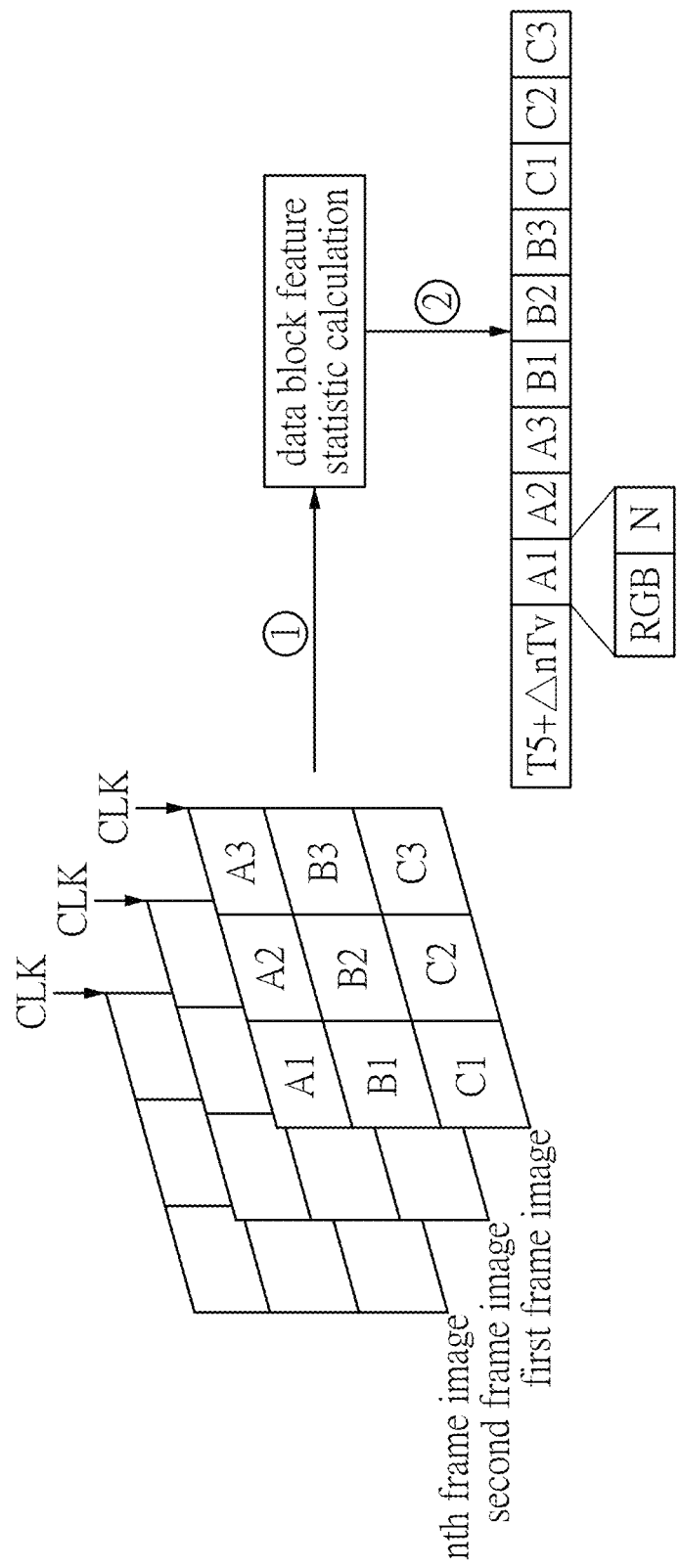
FIG. 3 is a workflow diagram of a screen acquisition module for achieving synchronized audio and image control of lighting according to embodiments of the present disclosure.

In Step 2, referring to FIG. 3, the screen acquisition module 12 receives an acquisition frequency of each frame, a start time stamp, a number of image blocks per frame and area outputted by the strategy control module 11, reading a complete frame of data each time, achieving a dominant color extraction according to a K-means clustering algorithm via a data block feature statistic calculation, obtaining an RGB value of a most dominant color and a corresponding brightness value N in each data block, and obtaining a calculation time duration $\Delta Tv$; in which an nth frame image feature data packet is formed according to the calculation.

Figure 4:
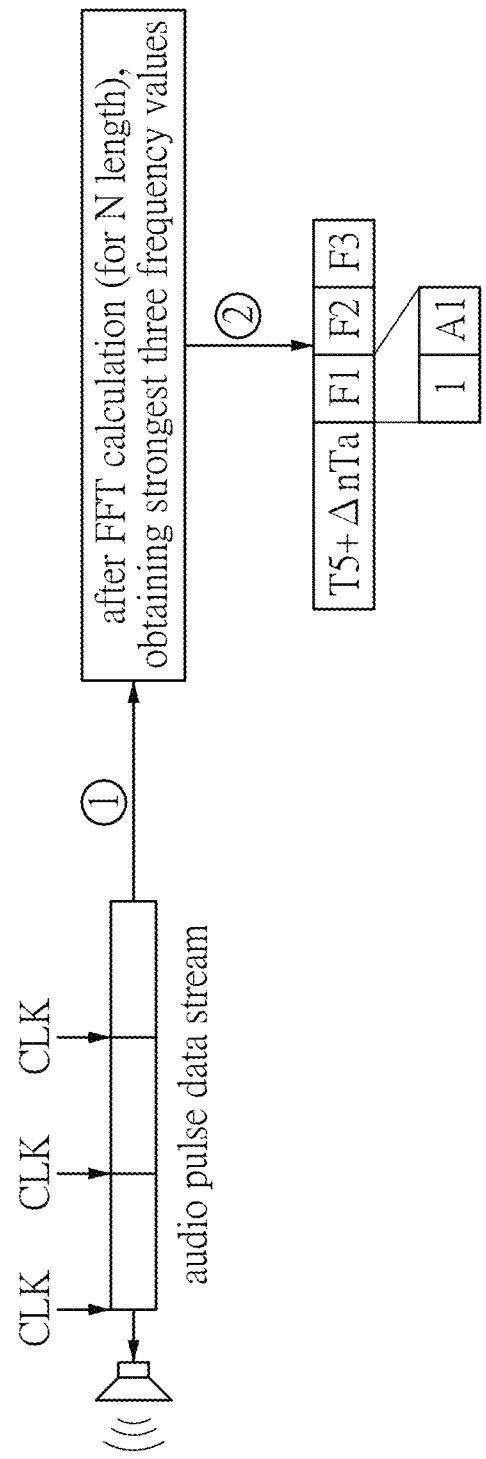
FIG. 4 is a workflow diagram of an audio acquisition module for achieving synchronized audio and image control of lighting according to embodiments of the present disclosure.

In Step 3, referring to FIG. 4, the audio acquisition module 13 receives the acquisition frequency of each frame and the start time stamp outputted by the strategy control module 11, reading a complete frame of data each time through an interface function from an audio pulse data stream of the audio-image playback device, transforming a time domain signal sample to a sample in a discrete-time Fourier transform frequency domain after an FFT calculation, obtaining the strongest three frequency values F1, F2, F3 and an amplitude Af in each sample, and obtaining a calculated time duration $\Delta Ta$; in which an nth frame audio feature data packet is formed according to the calculation after adding a time stamp.

Figure 5:
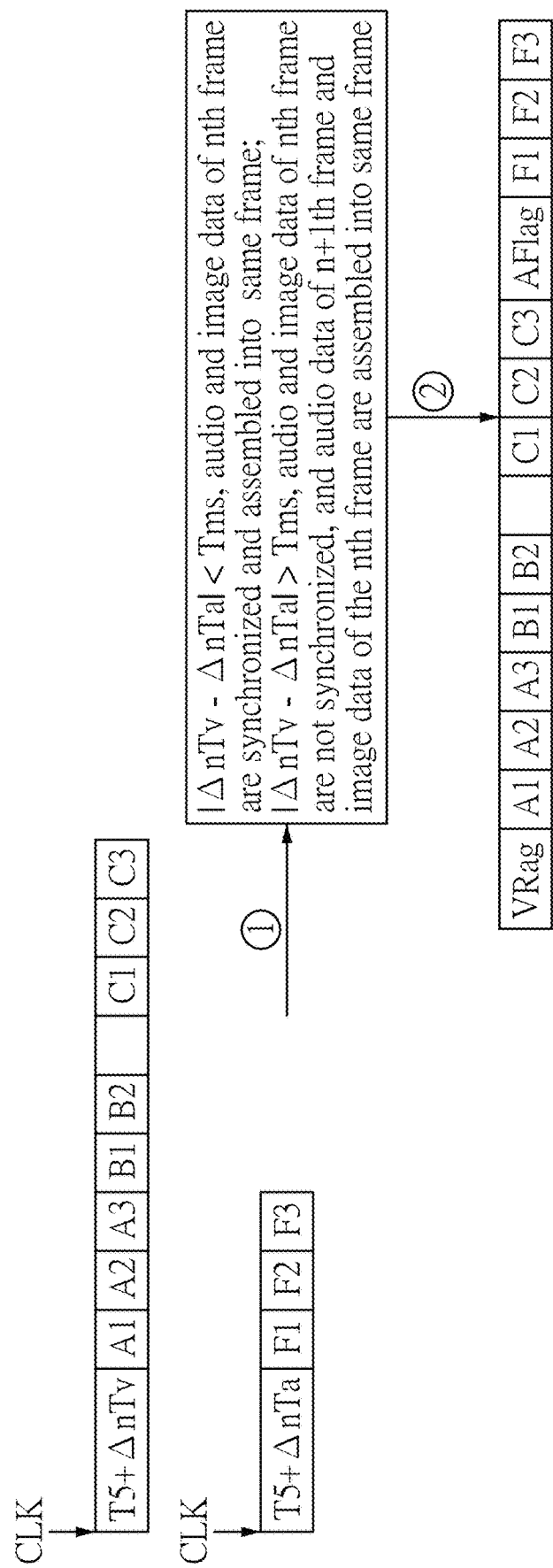
FIG. 5 is a workflow diagram of a data framing module for achieving synchronized audio and image control of lighting according to embodiments of the present disclosure.

In Step 4, referring to FIG. 5, the data framing module 14 receives the acquisition frequency of each frame outputted by the strategy control module 11, and, according to the time stamp and a delay mark, reads data sampled at a same point in time or data acquired at an adjacent point in time from the cache unit; according to different delay of audio and image processing, composing data having a smallest delay interval into a same frame of audio and image synchronized mixed data packet; in which, when $|\Delta nTv - \Delta nTa| < Tms$ and audio and image data of the nth frame are synchronized, assembling the audio and image data of the nth frame into a same frame of synthesized frame data, in which $\Delta nTv$ indicates a time interval from the time stamp to an acquisition of video data of the nth frame, $\Delta nTa$ indicates a time interval from the time stamp to an acquisition of the audio data of the nth frame, and Tms indicates that an time point difference between the acquisitions of the audio and video data is T milliseconds; in which, when $|\Delta nTv - \Delta nTa| > Tms$ and the audio and image data of the nth frame are not synchronized, assembling audio data of an n+1th frame and the image data of the nth frame into a same frame of synthesized frame data, or assembling image data of the n+1th frame and the audio data of the nth frame into a same frame of synthesized frame data and transmitting the frame of synthesized frame data.

Figure 6:
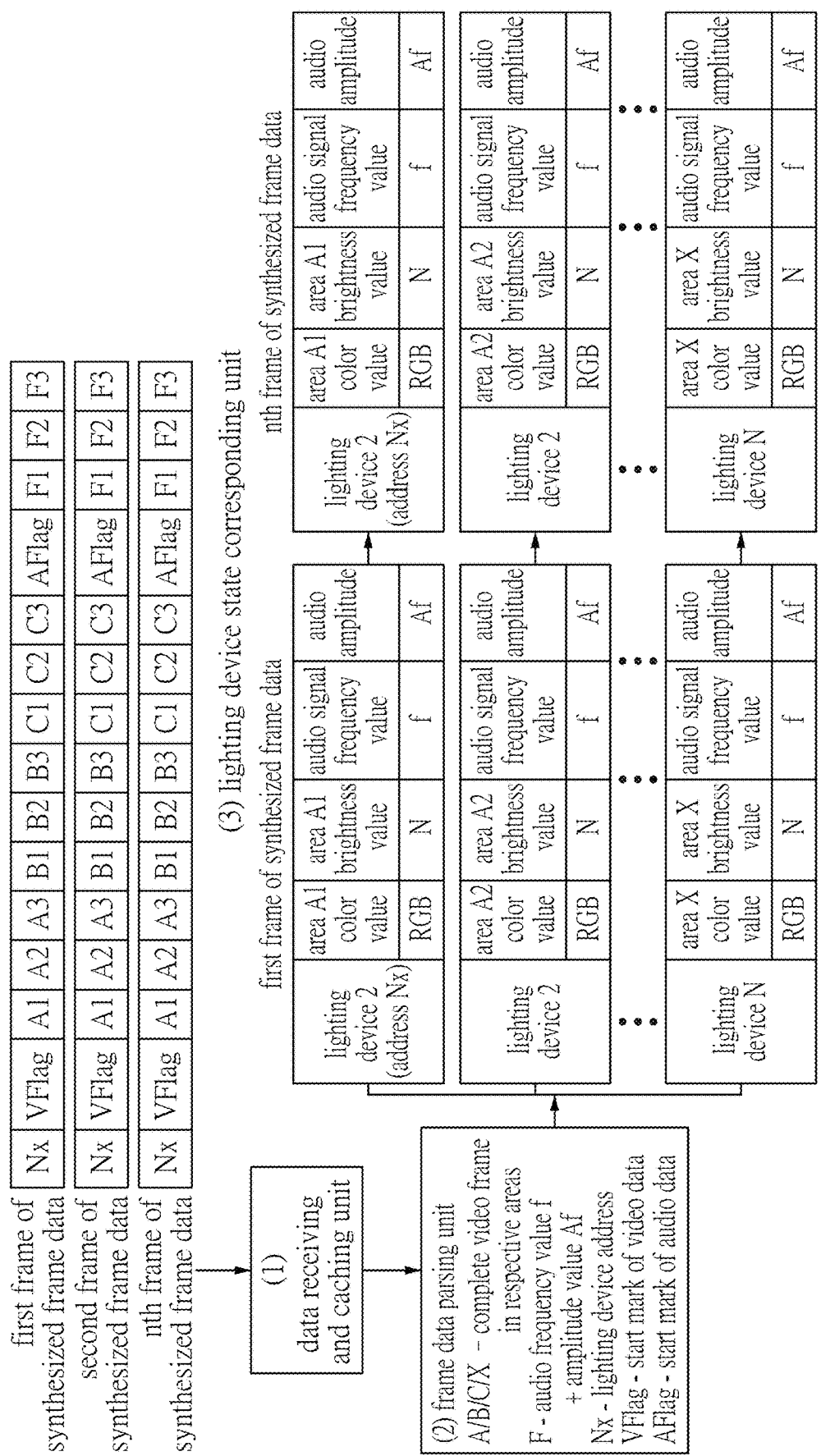
FIG. 6 is a reception and execution flow chart of a synchronization instruction for achieving synchronized audio and image control of lighting according to embodiments of the present disclosure.

Reference is made to FIG. 6, which shows that the lighting device 3 receiving and caching instructions, parsing data packets and converting into commands, and executing the instructions to control functions and statuses at a device end; specific steps for implementation are as follows:

Step 1, the data receiving and caching unit receives the synthesized frame data transmitted by the audio-image information acquisition and processing software and caches the synthesized frame data.

Step 2, the frame data parsing unit parses synthesized frame data of each frame, parse out the color and sound control instruction; the synthesized frame data of each frame include a lighting device address Nx, an area color value RGB, an area brightness value N, a sound frequency value f, a sound amplitude value Af, A/B/C/X information that respectively indicate a complete video frame in an area A/area B/area C/customized extension area X, after the screen acquisition module acquires RGB data of each pixel in the above-mentioned areas, a mean calculation is performed to obtain RGB value of the area A/area B/area C, F information that contain an amplitude value of sound acquired at a point in time and the audio frequency value f and the corresponding audio amplitude value Af at the point in time are obtained after an FFT calculation, a Vflag that indicate a start mark of video data in a same frame data, and an Aflag that indicate a start mark of audio data in the same frame data.

Step 3, the lighting device state corresponding unit converts the lighting device address Nx, the area color signal value RGB, the area brightness value N, the audio signal frequency value f, and the audio amplitude Af that are parsed, into the color and brightness signal values of the corresponding lighting device according to the predetermined control strategy.

Modes of communication of the linkage between multiple lamps of the lighting device 3 at the backend is supported by the following: the mode of communication is controlled by one or more modes of Wi-Fi LAN broadcast, Wi-Fi WAN, Wi-Fi mDNS protocol, BLUETOOTH® mesh, and ZIGBEE® mesh.

Reference is made to FIG. 7, FIG. 8, FIG. 9, FIG. 10, which are schematic diagrams of modes of presentation of four lighting effects of the lighting device in the single lamp or the linkage between multiple lamps.

Figure 7:
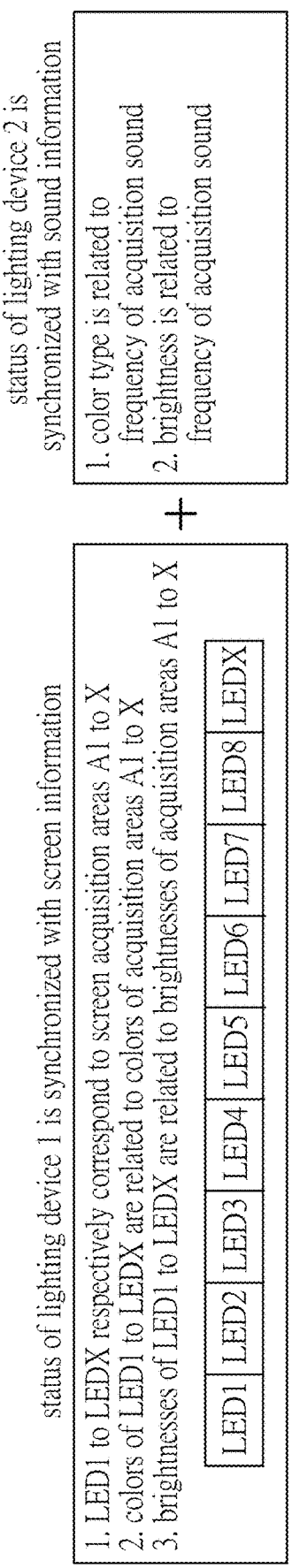
FIG. 7 is a schematic diagram of a lighting synchronization type one for achieving synchronized audio and image control of lighting according to embodiments of the present disclosure.
Figure 9:
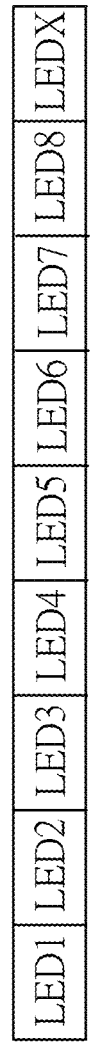
FIG. 9 is a schematic diagram of a lighting synchronization type three for achieving synchronized audio and image control of lighting according to embodiments of the present disclosure.

The modes of presentation of lighting effects of the lighting device 3 in the single lamp or the linkage between multiple lamps is as follows:

Reference is made to FIG. 7, which shows mode one: a mode of combination of multiple ones of the lighting devices 3 achieves changes that synchronize with screen color and sound; for example, a mode of combination of a lighting device 1 and a lighting device 2 achieves changes that synchronize with screen color and sound; a status of the lighting device 1 is synchronous with screen information, LED1 to LEDX respectively correspond to screen acquisition areas A1 to X, colors of the LED1 to LEDX are related to colors of the acquisition areas A1 to X, and brightnesses of the LED1 to LEDX are related to brightnesses of the acquisition areas A1 to X; a status of the lighting device 2 is synchronous with sound information, a color type is related to an acquisition sound frequency, and a magnitude of brightness is related to an acquisition sound amplitude value;

Reference is made to FIG. 8, which shows mode two: two and more than two of the multiple ones of the lighting devices 3 synchronously achieve changes that synchronize with the screen color and sound; for example, two and more than two of lighting devices 1 to X synchronously achieve changes that synchronize with the screen color and sound; a color of the lighting device 1 is related to the color of the acquisition area A1, and the brightness is related to an amplitude of one frequency F of the acquisition sound;

Reference is made to FIG. 9, which shows mode three: an independent lighting in the lighting device 3 achieves changes that synchronize with the screen color and sound via two states, respectively; for example, the lighting device achieves changes that synchronize with the screen color and sound via two states, respectively, in a state one: the colors of the LED1 to LEDX are related to colors of the acquisition areas A1 to X, and brightnesses of the LED1 to LEDX are related to brightnesses of the acquisition areas A1 to X; in a state two: the colors of the LED1 to LEDX are related to the acquisition sound frequency, and brightnesses of the LED1 to LEDX are related to the acquisition sound amplitude value;

Reference is made to FIG. 10, which shows mode four: the lighting device 3 achieves changes that synchronize with the screen color and sound via two states, respectively; for example, the lighting device achieves changes that synchronize with the screen color and sound via two states, respectively, in a state one: the colors of the LED1 to LEDX are related to colors of any area of the acquisition areas A1 to X, and brightnesses of the LED1 to LEDX are related to brightness of any area of the acquisition areas A1 to X; in a state two: the colors of the LED1 to LEDX are related to one acquisition sound frequency, and brightnesses of the LED1 to LEDX are related to the acquisition sound amplitude value.

Figure 11:
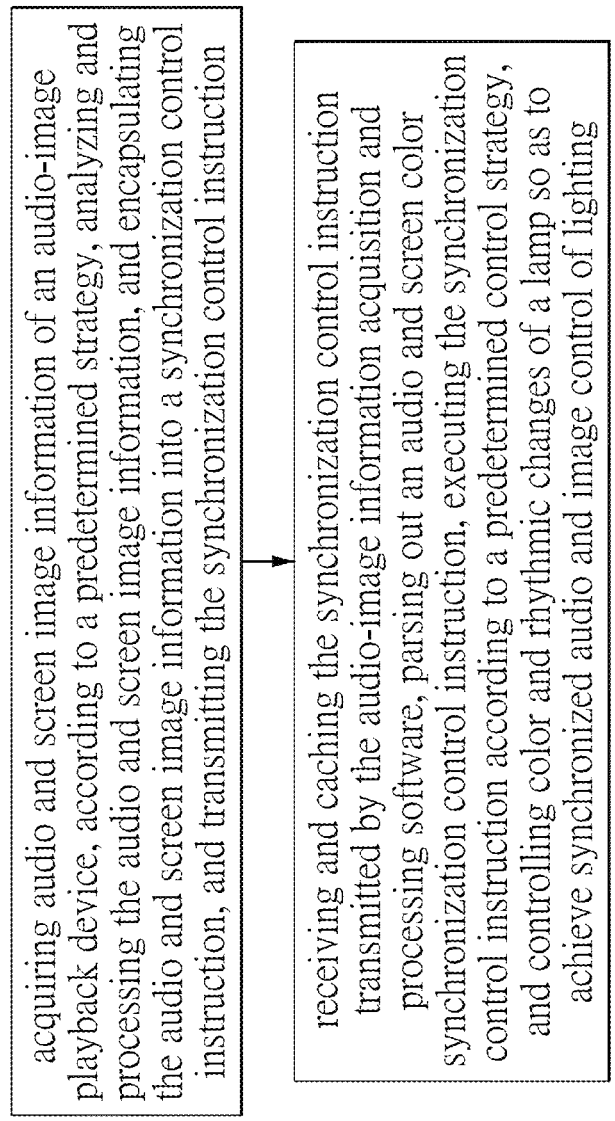
FIG. 11 is a workflow diagram for realizing synchronized audio and image control of lighting according to embodiments of the present disclosure.

Reference is made to FIG. 11, in which a workflow diagram for realizing synchronized audio and image control of lighting according to the embodiments is shown as follows:

S1: the audio-image information acquisition and processing software 1 in the audio-image playback device acquires audio and screen image information of the audio-image playback device, according to a predetermined strategy, analyses and processes the audio and screen image information, and encapsulates the audio and screen image information into a synchronization control instruction, and transmitting the synchronization control instruction;

S2: the lighting device 3 receives and caches the synchronization control instruction transmitted by the audio-image information acquisition and processing software 1, parses out an audio and screen color synchronization control instruction, executes the synchronization control instruction according to a predetermined control strategy, and controls color and rhythmic changes of a lamp so as to achieve synchronized audio and image control of lighting.

Embodiments of the present disclosure provide a method for achieving synchronized audio and image control of lighting, and the method includes: audio-image information acquisition and processing software 1 in a mobile phone or PAD acquiring a screen image of a display screen and simultaneously acquiring a sound broadcasted in a speaker of the mobile phone/PAD; determining an RGB value according to the screen image and determining a frequency of an audio according to the acquired audio signal; controlling a color of a ambient lamp corresponding to the display screen according to the RGB value, and controlling a rhythm and pattern of the ambient lamp according to features of the frequency of the audio; achieving a synchronization of the ambient lamp of the display screen with the display screen image color; simultaneously collecting the corresponding screen audio signal, through an audio and image synchronization algorithm, and avoiding audio and image advance presence or lag so as to obtain a lamp control effect matching with audio and image of the original content.

Another embodiment of the present disclosure provides a method for achieving synchronized audio and image control of lightings, and the method includes: the audio-image information acquisition and processing software 1 in a PC acquiring the screen image of the display screen and simultaneously acquiring a sound broadcasted on a speaker of the PC; determining the RGB value according to the screen image, and determining the audio frequency according to the acquired audio signal; controlling the color of the ambient lamp corresponding to the display screen according to the RGB value, and controlling the rhythm and pattern of the ambient lamp according to the features of the frequency of the audio.

Another embodiment of the present disclosure provides a method for achieving synchronized audio and image control of lightings, and the method includes: the audio-image information acquisition and processing software 1 in a TV acquiring the screen image of the display screen and simultaneously acquiring a sound broadcasted on a speaker of the TV; determining the RGB value according to the screen image, and determining the audio frequency according to the acquired audio signal; controlling the color of the ambient lamp corresponding to the display screen according to the RGB value, and controlling the rhythm and pattern of the ambient lamp according to the features of the frequency of the audio.

The embodiments of the present disclosure achieve the synchronized display effect of the ambient lamp by combining two factors of audio and image according to the instructions of the acquisition software at the frontend.

The foregoing describes in further detail of the present disclosure in conjunction with specific preferred embodiments, and it cannot be assumed that the specific embodiments of the present disclosure are limited to these descriptions. For persons having ordinary skill in the art to which the present disclosure belongs, without departing from the premise of the conception of the present disclosure, a number of equivalent substitutions or obvious variants can be made, and the same performance or use shall be considered to fall within the scope of protection of the present disclosure.

What is claimed is:

1. A system for achieving synchronized audio and image control of lighting, comprising:
    audio-image information acquisition and processing software (1) in an audio-image playback device for achieving audio and screen image information acquisition, according to a predetermined strategy, analyzing and processing the audio and screen image information, and encapsulating the audio and screen image information into a synchronization control instruction;
    a cloud server (2) for storing user login information, control command information for at least one lighting device (3), and status information reported by the lighting device (3); and
    the lighting device (3) for receiving the synchronization control instruction transmitted by the audio-image information acquisition and processing software (1), separating audio and screen image color control commands, and controlling color and rhythm changes of a lamp according to a predetermined control strategy so as to achieve synchronized audio and image control of the lighting;
    wherein the audio-image information acquisition and processing software (1) includes: a strategy control module (11), a screen acquisition module (12), an audio acquisition module (13), and a data framing module (14); the strategy control module (11) configures and transmits audio and screen image sampling strategies according to a user-definition; the screen acquisition module (12) receives the sampling strategies transmitted by the strategy control module (11) and accordingly acquires image feature data; the audio acquisition module (13) receives the sampling strategies transmitted by the strategy control module (11) and accordingly acquires audio feature data; the data framing module (14) receives the sampling strategies transmitted by the strategy control module (11) and assembles the image feature data acquired by the screen acquisition module (12) and the audio feature data acquired by the audio acquisition module (13) into a same frame to form synthesized frame data and transmit the synthesized frame data;
    wherein the cloud server (2) includes N+1 backup cloud servers;
    wherein the lighting device (3) includes a data receiving and caching unit, a frame data parsing unit, and a lighting device status corresponding unit; wherein the data receiving and caching unit receives and caches the synthesized frame data transmitted by the audio-image information acquisition and processing software (1), the frame data parsing unit parses out a color and sound control instruction from the synthesized frame data cached by the data receiving and caching unit, and the lighting device status corresponding unit synchronously converts the color and sound control instruction parsed out by the frame data parsing unit into color and brightness signal values of the corresponding lighting device (3).

2. The system according to claim 1, wherein the lighting device (3) is plural in quantity and the plurality of lighting devices (3) are controlled by one or more modes of Wi-Fi LAN broadcast, Wi-Fi WAN, Wi-Fi mDNS protocol, BLUETOOTH® mesh, and ZIGBEE® mesh, so as to achieve linkage therebetween.

3. The system according to claim 1, wherein the strategy control module (11) receives a user-defined configuration on the audio and screen image sampling strategies, and accordingly outputs an audio and screen image acquisition range, an acquisition clock, a clock stamp label, a number of screen image blocks, and an acquisition area; wherein the audio sampling strategy includes an input source of audio acquisition, a number of channels of acquisition sound, audio sampling frequencies, and an audio data buffer; wherein the screen image sampling strategy includes image sampling frequencies, a number of color acquisition blocks, and a color acquisition area.

4. The system according to claim 1, wherein the screen acquisition module (12) receives an acquisition frequency of each frame, a start time stamp, a number of image blocks per frame and area outputted by the strategy control module (11), reading a complete frame of data each time, achieving a dominant color extraction according to a K-means clustering algorithm via a data block feature statistic calculation, obtaining an RGB value of the most dominant color and a corresponding brightness value N in each data block, and obtaining a calculation time duration ΔTv; wherein an nth frame image feature data packet is formed according to the calculation.

5. The system according to claim 4, wherein the audio acquisition module (13) receives the acquisition frequency of each frame and the start time stamp outputted by the strategy control module (11), reading a complete frame of data each time through an interface function from an audio pulse data stream of the audio-image playback device, transforming a time domain signal sample to a sample in a discrete-time Fourier transform frequency domain after an FFT calculation, obtaining the strongest three frequency values F1, F2, F3 and an amplitude Af in each sample, and obtaining a calculated time duration ΔTa; wherein an nth frame audio feature data packet is formed according to the calculation after adding a time stamp.

6. The system according to claim 5, wherein the data framing module (14) receives the acquisition frequency of each frame outputted by the strategy control module (11), and, according to the time stamp and a delay mark, reads data sampled at a same point in time or data acquired at an adjacent point in time from the cache unit; according to different delay of audio and image processing, composing data having a smallest delay interval into a same frame of audio and image synchronized mixed data packet; wherein, when |ΔnTv−ΔnTa|<Tms and audio and image data of the nth frame are synchronized, assembling the audio and image data of the nth frame into a same frame of synthesized frame data, wherein ΔnTv indicates a time interval from the time stamp to an acquisition of video data of the nth frame, ΔnTa indicates a time interval from the time stamp to an acquisition of the audio data of the nth frame, and Tms indicates that an time point difference between the acquisitions of the audio and video data is T milliseconds; wherein, when |ΔnTv−ΔnTa|>Tms and the audio and image data of the nth frame are not synchronized, assembling audio data of an n+1th frame and the image data of the nth frame into a same frame of synthesized frame data, or assembling image data of the n+1th frame and the audio data of the nth frame into a same frame of synthesized frame data and transmitting the frame of synthesized frame data.

7. The system according to claim 1,
wherein the data receiving and caching unit receives the synthesized frame data transmitted by the audio-image information acquisition and processing software and caches the synthesized frame data;
wherein the frame data parsing unit parses synthesized frame data of each frame, parse out the color and sound control instruction; the synthesized frame data of each frame include a lighting device address Nx, an area color value RGB, an area brightness value N, a sound frequency value f, a sound amplitude value Af, A/B/C/X information that respectively indicate a complete video frame in an area A/area B/area C/customized extension area X, after the screen acquisition module acquires RGB data of each pixel in the above-mentioned areas, a mean calculation is performed to obtain RGB value of the area A/area B/area C, F information that contain an amplitude value of sound acquired at a point in time and the audio frequency value f and the corresponding audio amplitude value Af at the point in time are obtained after an FFT calculation, a Vflag that indicate a start mark of video data in a same frame data, and an Aflag that indicate a start mark of audio data in the same frame data;
wherein the lighting device state corresponding unit converts the lighting device address Nx, the area color signal value RGB, the area brightness value N, the audio signal frequency value f, and the audio amplitude Af that are parsed, into the color and brightness signal values of the corresponding lighting device according to the predetermined control strategy.

8. The system according to claim 1, wherein the achieving synchronized audio and image control of lighting includes:
a mode of combination of multiple ones of the lighting devices (3) achieving changes that synchronize with screen color and sound;
or two and more than two of the multiple ones of the lighting devices (3) synchronously achieving changes that synchronize with the screen color and sound;
or an independent lighting in the lighting device (3) achieving changes that synchronize with the screen color and sound via two states, respectively;
or the lighting device (3) achieving changes that synchronize with the screen color and sound via two states, respectively.

9. A method for achieving synchronized audio and image control of lighting, comprising steps as follows:
S1 comprising: acquiring audio and screen image information of an audio-image playback device, according to a predetermined strategy, analyzing and processing the audio and screen image information, and encapsulating the audio and screen image information into a synchronization control instruction, and transmitting the synchronization control instruction;
S2 comprising: receiving and caching the synchronization control instruction transmitted by an audio-information acquisition and processing software, parsing out an audio and screen color synchronization control instruction, executing the synchronization control instruction according to a predetermined control strategy, and controlling color and rhythmic changes of a lamp so as to achieve synchronized audio and image control of lighting;
wherein step S1 includes: receiving a user-defined configuration on audio and screen image sampling strategies, and accordingly outputting an audio and screen image acquisition range, an acquisition clock, a clock stamp label, a number of screen image blocks, and an acquisition area; wherein the audio sampling strategy includes an input source of audio acquisition, a number of channels of acquisition sound, audio sampling frequencies, and an audio data buffer; wherein the screen image sampling strategy includes image sampling frequencies, a number of color acquisition blocks, and a color acquisition area.

10. The method according to claim 9, wherein step S1 further includes: receiving an acquisition frequency of each frame, a start time stamp, a number of image blocks per frame and area outputted by a strategy control module (11), reading a complete frame of data each time, achieving a dominant color extraction according to a K-means clustering algorithm via a data block feature statistic calculation, obtaining an RGB value of a most dominant color and a corresponding brightness value N in each data block, and obtaining a calculation time duration ΔTv; wherein an nth frame image feature data packet is formed according to the calculation.

11. The method according to claim 10, wherein step S1 further includes: receiving the acquisition frequency of each frame and the start time stamp outputted by the strategy control module (11), reading a complete frame of data each time through an interface function from an audio pulse data stream of the audio-image playback device, transforming a time domain signal sample to a sample in a discrete-time Fourier transform frequency domain after an FFT calculation, obtaining the strongest three frequency values F1, F2, F3 and an amplitude Af in each sample, and obtaining a calculated time duration $\Delta Ta$; wherein an nth frame audio feature data packet is formed according to the calculation after adding a time stamp.

12. The method according to claim 11, wherein step S1 further includes: receiving the acquisition frequency of each frame outputted by the strategy control module (11), and, according to the time stamp and a delay mark, reading data sampled at a same point in time or data acquired at an adjacent point in time from the cache unit; according to different delay of audio and image processing, composing data having a smallest delay interval into a same frame of audio and image synchronized mixed data packet; wherein, when $|\Delta nTv - \Delta nTa| < Tms$ and audio and image data of the nth frame are synchronized, assembling the audio and image data of the nth frame into a same frame of synthesized frame data, wherein $\Delta nTv$ indicates a time interval from the time stamp to an acquisition of video data of the nth frame, $\Delta nTa$ indicates a time interval from the time stamp to an acquisition of the audio data of the nth frame, and Tms indicates that an time point difference between the acquisitions of the audio and video data is T milliseconds; wherein, when $|\Delta nTv - \Delta nTa| > Tms$ and the audio and image data of the nth frame are not synchronized, assembling audio data of an n+1th frame and the image data of the nth frame into a same frame of synthesized frame data, or assembling image data of the n+1th frame and the audio data of the nth frame into a same frame of synthesized frame data and transmitting the frame of synthesized frame data.

13. The method according to claim 9, wherein step S2 includes steps as follows:

S21: receiving the synthesized frame data transmitted by the audio-image information acquisition and processing software and caching the synthesized frame data;

S22: parsing synthesized frame data of each frame, parsing out the color and sound control instruction; the synthesized frame data of each frame include a lighting device address Nx, an area color value RGB, an area brightness value N, a sound frequency value f, a sound amplitude value Af, A/B/C/X information that respectively indicate a complete video frame in an area A/area B/area C/customized extension area X, after the screen acquisition module acquires RGB data of each pixel in the above-mentioned areas, a mean calculation is performed to obtain RGB value of the area A/area B/area C, F information that contain an amplitude value of sound acquired at a point in time and the audio frequency value f and the corresponding audio amplitude value Af at the point in time are obtained after an FFT calculation, a Vflag that indicate a start mark of video data in a same frame data, and an Aflag that indicate a start mark of audio data in the same frame data;

S23: converting the lighting device address Nx, the area color signal value RGB, the area brightness value N, the audio signal frequency value f, and the audio amplitude Af that are parsed, into the color and brightness signal values of the corresponding lighting device according to the predetermined control strategy.

14. The method according to claim 9, wherein a combination of multiple ones of the lighting devices (3) achieves changes that synchronize with screen color and sound;

or two and more than two of the multiple ones of the lighting devices (3) synchronously achieve changes that synchronize with the screen color and sound;

or an independent lighting in the lighting device (3) achieves changes that synchronize with the screen color and sound via two states, respectively;

or the lighting device (3) achieves changes that synchronize with the screen color and sound via two states, respectively.

\* \* \* \* \*